(12) United States Patent
A'Hearn

(10) Patent No.: US 6,205,781 B1
(45) Date of Patent: Mar. 27, 2001

(54) FLUID CONTROL SYSTEM INCLUDING A WORK ELEMENT AND A VALVE ARRANGEMENT FOR SELECTIVELY SUPPLYING PRESSURIZED FLUID THERETO FROM TWO PRESSURIZED FLUID SOURCES

(75) Inventor: Michael A. A'Hearn, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/257,774

(22) Filed: Feb. 25, 1999

(51) Int. Cl.[7] ................................................. F16D 31/02
(52) U.S. Cl. .......................... 60/421; 60/486; 60/422
(58) Field of Search ............................. 60/421, 422, 428, 60/429, 430, 486

(56) References Cited

U.S. PATENT DOCUMENTS

| | | | |
|---|---|---|---|
| 3,952,510 | * 4/1976 | Peterson | 60/429 X |
| 3,975,909 | * 8/1976 | McBurnett | 60/421 |
| 3,987,623 | * 10/1976 | Bianchetta | 60/422 |
| 3,994,133 | * 11/1976 | Pfeil et al. | 60/422 |
| 4,044,786 | * 8/1977 | Yip | 60/421 X |
| 4,422,290 | * 12/1983 | Huffman | 60/422 X |
| 4,449,365 | * 5/1984 | Hancock | 60/422 |
| 4,454,715 | 6/1984 | Muller et al. | |
| 4,473,090 | * 9/1984 | Uehara et al. | 60/421 X |
| 4,553,389 | * 11/1985 | Tischer et al. | 60/421 X |
| 4,635,439 | * 1/1987 | Wible | 60/420 |
| 5,063,739 | 11/1991 | Bianchetta et al. | |

* cited by examiner

Primary Examiner—John E. Ryznic
(74) Attorney, Agent, or Firm—Haverstock, Garrett & Roberts; J. W. Burrows

(57) ABSTRACT

A fluid control system including a valve arrangement operable for selectively, controllably supplying pressurized fluid to a work element of the system from at least two pressurized fluid sources depending on load conditions on the pressurized fluid sources. The valve arrangement is operable for directing pressurized fluid from the first pressurized fluid source to the work element when a first or low load condition is present on the first pressurized fluid source and directing pressurized fluid from the second pressurized fluid source to the work element when a second or high load condition greater than the first load condition is present on the first pressurized fluid source and a low load condition is present on the second pressurized fluid source, such that operability of the work element and other work elements supplied by the pressurized fluid sources is maintained.

8 Claims, 2 Drawing Sheets

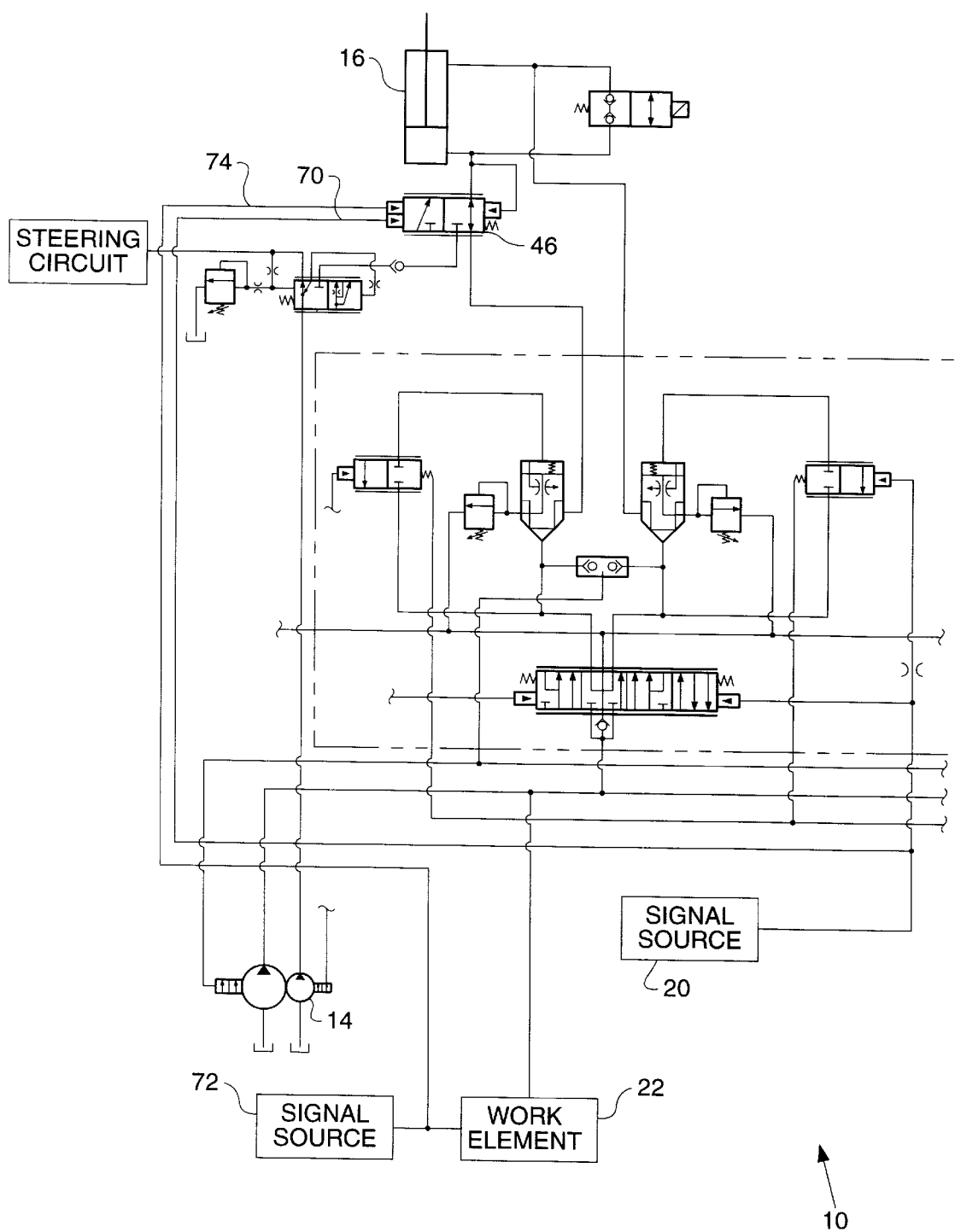
Fig_2_

FLUID CONTROL SYSTEM INCLUDING A WORK ELEMENT AND A VALVE ARRANGEMENT FOR SELECTIVELY SUPPLYING PRESSURIZED FLUID THERETO FROM TWO PRESSURIZED FLUID SOURCES

TECHNICAL FIELD

This invention relates generally to fluid control systems, and more particularly, to a system including a valve arrangement operable for selectively, controllably supplying pressurized fluid to a work element of the system from at least two pressurized fluid sources depending on load conditions on the pressurized fluid sources.

BACKGROUND ART

In fluid control systems having a plurality of work elements, such as a fluid control system on a bucket loader having work elements including a lift actuator for lifting the bucket and a tilt actuator for tilting the bucket, it is common practice to provide the work elements with pressurized fluid from a single pressurized fluid source by interconnecting the work elements in parallel. However, if the work elements are operating under greatly different pressure conditions, because they are linked hydraulically in parallel, fluid flow from the pressurized fluid source will tend to follow the path of least resistance to the lower pressure work element, resulting in less fluid supply to the higher pressure work element and poor operability thereof.

As an attempted remedy to this problem, an operator can try to find a modulation point for the lower pressure work element wherein fluid flow thereto is sufficiently restricted such that adequate fluid supply to the higher pressure element will be available. However, when such modulation point is found, it has been observed that both work elements will slow down and otherwise suffer from poor operability, due to the shared fluid supply.

In some applications, the fluid system will include an additional pressurized fluid source such as a steering pump that is idle or under-utilized when the above discussed work elements such as the lift and tilt actuators are being operated. Thus, it would be desirable to have the capability to direct pressurized fluid flow from the idle or under-utilized source to one of the working elements to improve the operability of the working elements.

Accordingly, the present invention is directed to overcoming one or more of the problems and achieving the results as set forth above.

DISCLOSURE OF THE INVENTION

In one aspect of the present invention, a fluid control system including a valve arrangement operable for selectively, controllably supplying pressurized fluid to a work element of the system from at least two pressurized fluid sources depending on load conditions on the pressurized fluid sources is disclosed. The valve arrangement is operable for directing pressurized fluid from the first pressurized fluid source to the work element when a first or low load condition is present on the first pressurized fluid source and directing pressurized fluid from the second pressurized fluid source to the work element when a second or high load condition greater than the first load condition is present on the first pressurized fluid source and a low load condition is present on the second pressurized fluid source, such that operability of the work element and other work elements supplied by the pressurized fluid sources is maintained.

BRIEF DESCRIPTION OF THE DRAWINGS

FIG. 2 is a diagrammatic view of a further embodiment of the present invention.

BEST MODE FOR CARRYING OUT THE INVENTION

Figure 1:
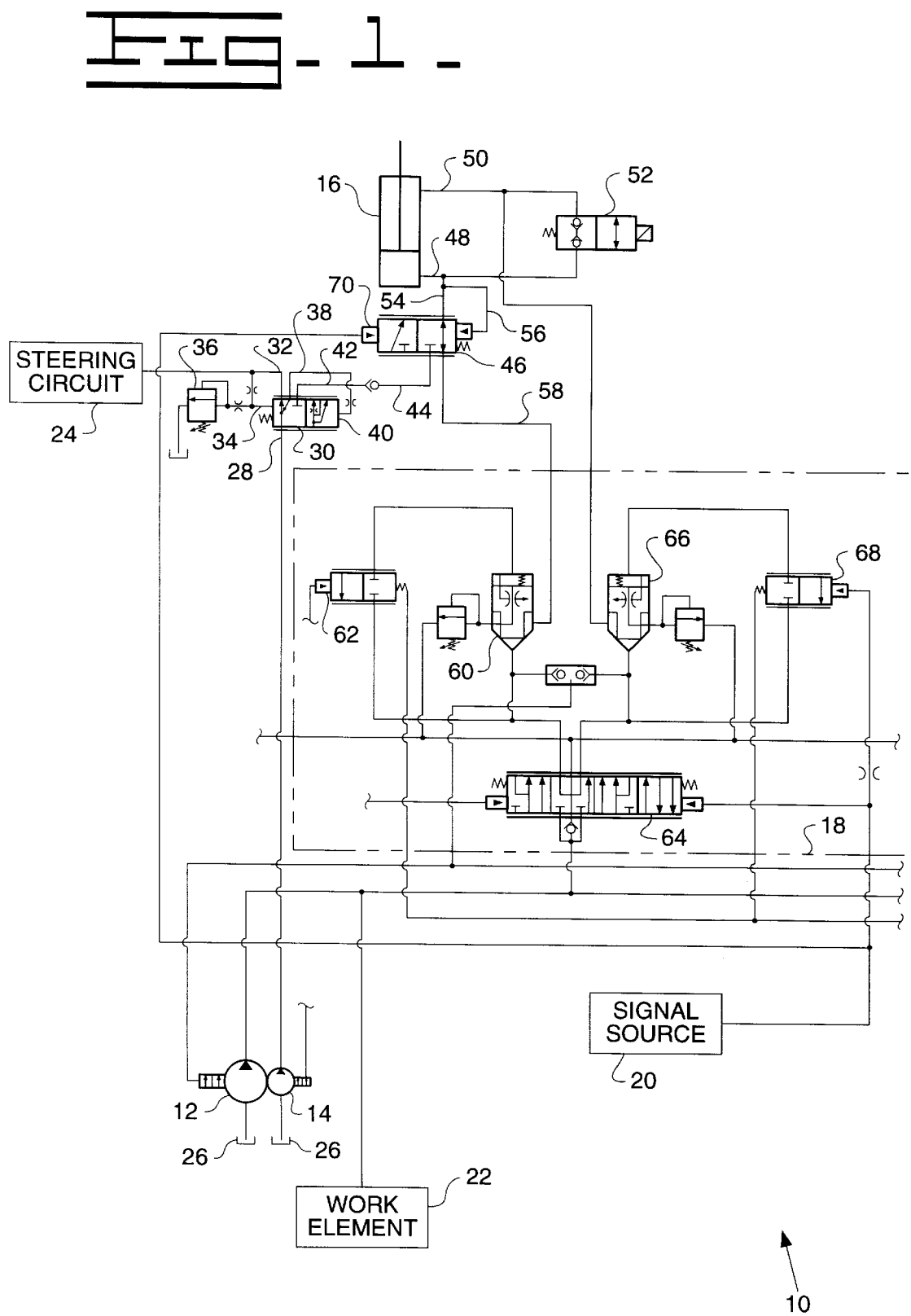
FIG. 1 is a diagrammatic view of an embodiment of the present invention.

Referring to the drawings, a fluid flow control system 10 is shown in FIG. 1 having a first pressurized fluid source 12, a second pressurized fluid source 14, a first work element 16, and a control circuit 18 for controlling fluid flow to and from first work element 16 under control of signals received from a signal source 20. System 10 additionally includes a second work element 22, and a steering circuit 24 including another work element such as a steering motor (not shown). First pressurized fluid source 12 is preferably a variable displacement pump operable for drawing fluid from a tank 26 and is connected to first work element 16 via control circuit 18, and is connected to work element 22 either directly as shown or via a similar control circuit (not shown), for delivering pressurized fluid to both work elements 16 and 22. Second pressurized fluid source 14 is also preferably a variable displacement pump operable for drawing fluid from tank 26 and is connected to an inlet port 28 of a priority valve 30 operable for delivering pressurized fluid thereto. Priority valve 30 is a load sensing, infinitely variable, pilot signal operated valve having a first outlet port 32 connected directly to steering circuit 24, and connected through a restricted orifice to a pilot signal port 34 and a pressure relief valve 36. Priority valve 30 includes a second outlet port 38 connected through a restricted orifice to a second pilot signal port 40 thereof, and a third outlet port 42 connected to a first port 44 of a load sensing, infinitely variable, pilot signal operated switching valve 46. Priority valve 30 is selectively movable between a first position for delivering fluid under pressure from fluid source 14 to steering circuit 24 only, and a second position for delivering pressurized fluid to both steering circuit 24 and switching valve 46, based on whether steering circuit 24 is operating under a high load, or a low load or idle condition, respectively.

First work element 16 is a fluid cylinder including a first port 48 connected to a head end thereof, and a second port 50 connected to a rod end thereof, first port 48 and second port 50 being connected by a solenoid controlled valve 52 operable for equalizing the pressure conditions therein when desired. First work element 16 is representative of hydraulic cylinders used for a wide variety of applications, such as a tilt actuator for a bucket of a loader or other work machine (not shown).

Switching valve 46 includes a second port 54 connected to first port 48 of work element 16, and to a first signal port 56 of valve 46 for providing a load sensing capability. Valve 46 also includes a third port 58 connected to an inlet port of a first poppet valve 60 of control circuit 18, poppet valve 60 being conventionally operable by a pilot signal operated control valve 62 and a pilot signal operated main control valve 64. Control circuit 18 includes a second poppet valve 66 operable under control of a pi-Lot signal operated second control valve 68 and main control valve 64 for allowing fluid flow to and from second port 50 of work element 16, based on a pilot signal received from signal source 20 connected to valves 64 and 68. Control circuit 18 is conventionally operable for allowing pressurized fluid flow to switching valve 46 and second port 50 of work element 16 based on signals received from signal source 20 and a signal source (not shown) connected to poppet control valve 62 and main control valve 64, the signal sources preferably including one or more operator controlled valves located in an operator cab of a machine on which fluid control system 10 is located.

Switching valve 46 includes a second signal port 70 connected to signal source 20 for receiving signals therefrom and is selectively movable between a first position wherein flow between first port 48 of work element 16 and control circuit 18 is allowed, and a second position wherein pressurized fluid flow from priority valve 30 (when available) is allowed, based on the relative signals present on signal ports 56 and 70.

In operation, under conditions wherein a relatively strong load signal representative of a low load condition on first pressurized fluid source 12 is present on signal port 56 of switch valve 46 and a weaker or no signal is present on signal port 70 of valve 46, valve 46 will remain in the position shown to allow flow between first port 48 of work element 16 and poppet valve 60 of control circuit 18. When a signal from signal source 20 is received on poppet control valve 68 to allow fluid flow through poppet valve 66 from second port 50 of work element 16, the same signal is present on signal port 70 of switching valve 46. This signal will be representative of a higher load condition on first pressurized fluid source 12 and will be operable to move valve 46 toward the second position (as permitted by a weaker load signal on signal port 56) to allow pressurized fluid from second pressurized fluid source 14 to enter first port 48 of work element 16, if steering circuit 24 is under-utilized, idle, or otherwise under a low load condition, such that priority valve 30 is moved at least partially toward its second position. This capability is particularly valuable when work element 22 is simultaneously receiving pressurized fluid from first pressurized fluid source 12 and is more highly loaded than work element 16, for instance, where work element 16 is a tilt actuator for a bucket of a loader and work element 22 is a lift actuator for the bucket, an important advantage achieved being the ability to provide all of the pressurized fluid required by work element 22 such that operation thereof is not slowed or diminished, while still providing adequate pressurized fluid flow to work element 16.

Turning to FIG. 2, fluid control system 10 is shown including a second signal source 72 connected to work element 22 and also to a signal port 74 of switching valve 46 in parallel to the signal port 70 connected to signal source 20. Under operating conditions wherein a relatively strong load signal representative of a low load condition on first pressurized fluid source 12 is present on signal port 56 of switching valve 46 and weaker or no signals are present on signal ports 70 and 74, valve 46 will remain in the position shown to allow flow between first port 48 of work element 16 and poppet valve 60 of control circuit 18. When a signal or signals from signal source 20 and/or signal source 72 are present on signal port 70 and/or signal port 74 of valve 46 and are sufficiently strong (representing a high load condition on first pressurized fluid source 12) to move valve 46 toward the second position, pressurized fluid from second pressurized fluid source 14 via priority valve 30 will be allowed to enter first port 48 of work element 16, if steering circuit 24 is under-utilized or idle such that priority valve 30 is moved at least partially toward its second position. Again, a representative instance of when this latter condition would occur is where work element 16 is a tilt actuator for a bucket of a loader and work element 22 is a lift actuator for the bucket, and the signal or signals on signal port 70 and/or signal port 74 represent a high load condition on first pressurized fluid source 12.

Industrial Applicability

The present fluid control system has utility for a wide variety of hydraulic system applications, including, but not limited to, systems wherein the work element 16 is a tilt control cylinder for a bucket of a loader or the like and work element 22 is a lift control cylinder thereof. In this way parallel connection of the tilt and lift cylinders to a first pressurized fluid source can be cut under certain operating conditions, such as when the lift cylinder is heavily loaded such as in a raise mode, and wherein the tilt cylinder is only lightly loaded, such as for dumping, and pressurized fluid supplied to the tilt cylinder from a second pressurized fluid source, preferably a steering pump which is normally idle when the tilt and lift cylinders are both being used.

Other aspects, objects and advantages of the present invention can be obtained from a study of the drawings, the disclosure and the appended claims.

What is claimed is:

1. A fluid control system comprising:
   a first pressurized fluid source;
   a second pressurized fluid source;
   a work element; and
   a valve arrangement connected between the work element and each of the first and second pressurized fluid sources, the valve arrangement being operable for directing pressurized fluid from the first pressurized fluid source to the work element when a first load condition is present on the first pressurized fluid source and directing pressurized fluid from the second pressurized fluid source to the work element only when a second load condition greater than the first load condition is present on the first pressurized fluid source and a low load condition is present on the second pressurized fluid source.

2. The fluid control system of claim 1 wherein the valve arrangement comprises a first valve and a second valve, the first valve being operable for directing the pressurized fluid from the second pressurized fluid source to the second valve when the low load condition is present on the second pressurized fluid source, and the second valve being operable for directing the pressurized fluid from the first pressurized fluid source to the work element when the first load condition is present on the first pressurized fluid source and directing the pressurized fluid from the second pressurized fluid source to the work element when the second load condition greater than the first load condition is present on the first pressurized fluid source.

3. The fluid control system of claim 2, including a control circuit operable for controlling fluid flow between the first pressurized fluid source and the work element, the first valve is disposed between the second pressurized fluid source and the second valve, and the second valve is disposed between the work element and each of the first valve and the control circuit operable for controlling fluid flow between the first pressurized fluid source and the work element.

4. The fluid control system of claim 3, wherein the first valve is a signal operated priority valve and the second valve is a signal operated switching valve, the switching valve is operable to receive a first signal indicative of the load condition on the first pressurized fluid source and a second signal indicative of a load condition on the work element, and is operable to direct the pressurized fluid from the second pressurized fluid source to the work element when the first signal is greater than the second signal.

5. The fluid control system of claim 4, wherein the work element is a tilt actuator for a bucket of a loader.

6. The fluid control system of claim 5, further comprising a second work element including a lift actuator for the bucket connected to the first pressurized fluid source for receiving pressurized fluid therefrom.

7. The fluid control system of claim 6, wherein the second load condition is representative of simultaneous actuation of the tilt actuator and the lift actuator.

8. The fluid control system of claim 7, wherein the priority valve is connected between the second pressurized fluid source, the switching valve and a steering circuit.

* * * * *